July 16, 1968     I. HEDIN     3,392,513
CYCLONIC SEPARATOR
Filed Nov. 22, 1966
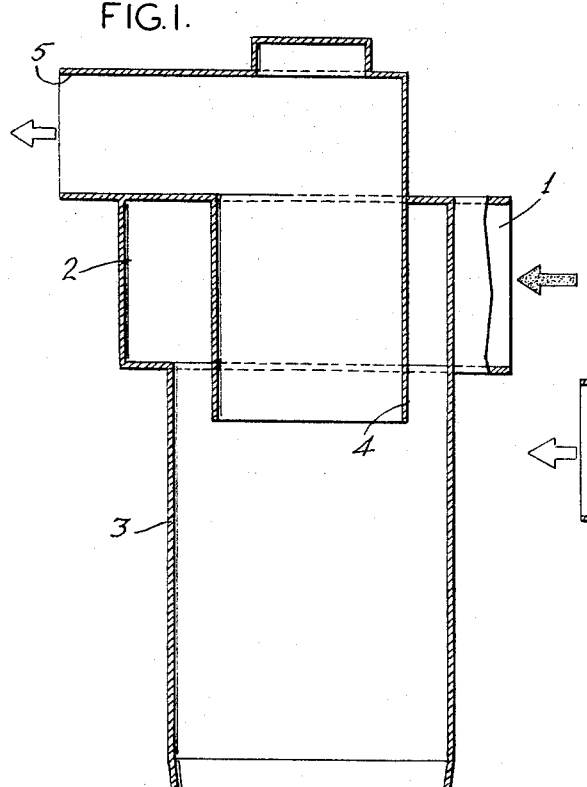
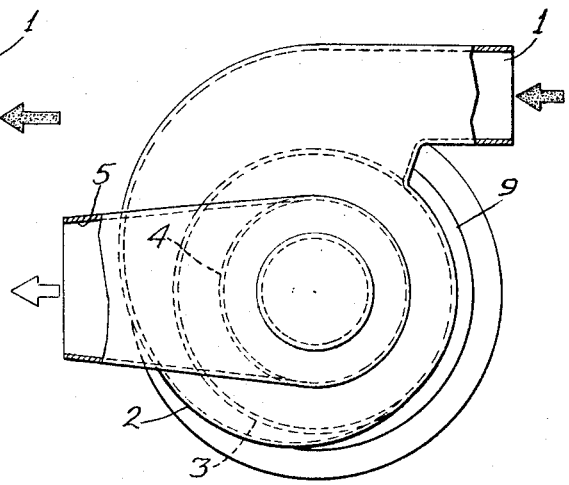
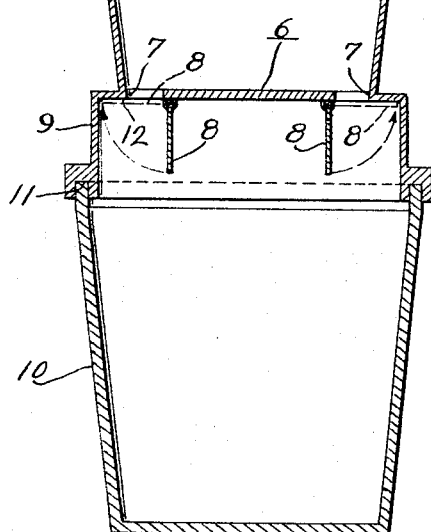
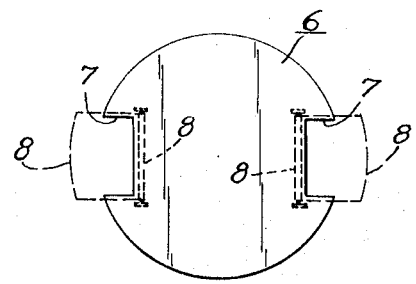
INVENTOR:
INGEMAR HEDIN
BY Howson & Howson
ATTYS.

United States Patent Office 3,392,513
Patented July 16, 1968

3,392,513
CYCLONIC SEPARATOR
Ingemar Hedin, Vaxjo, Sweden, assignor to Aktiebolaget Svenska Flakfabriken, Stockholm, Sweden
Filed Nov. 22, 1966, Ser. No. 596,136
Claims priority, application Sweden, Nov. 26, 1965, 15,295/65
3 Claims. (Cl. 55—425)

ABSTRACT OF THE DISCLOSURE

A cyclonic separator comprising a generally cylindrical casing having a spiral inlet portion with a tangential inlet for introducing dust-laden raw gas thereinto, and a central outlet tube for exhausting clean gas from the casing, the casing terminating at its opposite end in a plane botton wall having dust outlets therein for discharging the dust into a collecting bin of larger diameter than the openings. The bottom wall serves as the top wall of the collecting bin and provides a re-entrant releasing edge for said dust outlets. Dampers close the dust outlets when the dust-collecting bin is emptied or exchanged to permit continued operation of the separator.

---

The present invention relates to a cyclonic separator having a generally cylindrical casing shell provided above one end with an inlet portion having one or more tangential inlets for raw gas and enclosing a central tube for outgoing clean gas. The shell of the casing terminates at the opposite end in a bottom edge, and an imperforate plane bottom wall is mounted coplanar with the edge and forms one or more openings between the shell bottom edge and the outer periphery of the bottom wall to serve as outlets for separated dust.

The cyclonic separator according to the invention is preferably intended for use as a detached unit of vertical mounting.

In accordance with the present invention, the separator beyond the bottom wall is provided with a lower casing of generally cylindrical form having a cross-sectional area exceeding that of the shell at its bottom edge, the upper wall of the lower casing being coplanar with the bottom edge of said wall, and extending outwardly beyond the shell to form a releasing edge for the dust outlet openings. Preferably, the shell has a converging frusto-conical portion between the inlet and the bottom edge, and the dust openings are provided with dampers which may be displaced to cover the dust openings when the lower casing is emptied or exchanged.

By providing the casing with a releasing edge, a high degree of separation of the dust from the main casing is obtained, and the closing of the dampers for the outlet openings permits emptying or exchanging of the collecting dust bin while the separator is in operation.

An embodiment of the cyclonic separator according to the invention will now be described more in detail in the following with reference to the accompanying drawing figures whereof FIG. 1 shows a section through a cyclonic separator according to the invention, FIG. 2 shows a view from above of the separator according to FIG. 1, and FIG. 3 shows a horizontal view of a bottom plate.

With reference to the drawing, the separator comprises a generally cylindrical shell 3 having above its upper end a tangential inlet 1 for dust-laden raw gas, and above said inlet, an outlet head 5 for clean gas, and at the bottom, a lower casing 9 having a dust-collecting bin 10 mounted thereon. At the upper end, the inlet portion 2 of the shell is of spiral form, as shown in FIG. 2, so that the dust-laden gas entering through the inlet 1 has a helical rotary motion imparted thereto. In its rotating state, the gas is directed into a straight cylindrical portion 3 of the shell having a lower frusto-conical portion in which the dust is centrifugally separated from the gas, the cleaned gas leaving the shell through a central tube 4 projecting through and beyond said inlet 1 at the inlet end, the tube being connected to the outlet head 5. At its lower end, the shell terminates in a bottom edge, and has coplanar therewith a plane bottom wall 6, which in the present instance has cut-outs in its outer periphery which, in conjunction with the bottom edge, form two dust-outlet openings 7 positioned diametrically opposite one another.

The lower casing 9 is of straight cylindrical form having an enlarged cross-sectional dimension relative to the cross-sectional dimension of the shell at its bottom edge. As shown in FIG. 1, the top wall of the casing 9 is coplanar with the wall 6 and extends beyond the shell to provide a releasing edge 12 for the dust openings 7. In the operation of the separator, the dust flows out of the shell through the lower casing and is collected in the collecting-dust bin 10, which, by a lifting device attached to the lower casing 9 of the separator (not shown), can be raised up to the separator into tight engagement with the groove 11 in the lower casing. Dampers 8 are provided for the dust outlet openings 7 which may be displaced as indicated by the arrows to cover the openings 7, so that the collecting bin 10 may be emptied or exchanged while the separator is operating.

I claim:

1. In a cyclonic separator comprising a casing including a shell with a generally cylindrical portion having an inlet end with at least one tangential inlet for raw gas, a tube projecting through and beyond said tangential inlet centrally within said inlet portion to constitute a clean gas outlet, said shell having a bottom edge at the opposite end, a plane transverse bottom wall spaced from said outlet tube coplanar with said bottom edge, said plane wall being imperforate and extending to said bottom edge for a substantial portion of its periphery and forming with said edge at least one dust opening therebetween at the outer periphery of said wall to serve as an outlet for the separated dust; the improvement wherein said separator includes a lower casing beyond said bottom wall and of greater diameter than said shell at said bottom edge, said casing having a top wall coplanar with said bottom edge and said imperforate wall and extending from said bottom edge outwardly beyond the bottom edge of said shell, whereby the juncture of said top wall and said bottom edge forms a releasing edge for said dust opening.

2. A cyclonic separator according to claim 1 wherein said shell has at its lower end a downwardly converging frusto-conical portion terminating in said bottom edge.

3. A cyclonic separator according to claim 1 wherein said bottom wall forms two diametrically-opposed dust openings with the bottom edge of said shell at the outer periphery of said wall and including dampers in said lower chamber mounted to cover said dust openings when said lower casing is emptied or exchanged.

References Cited

UNITED STATES PATENTS

| | | | |
|---|---|---|---|
| 414,980 | 11/1889 | Kutsche | 55—426 |
| 603,285 | 5/1898 | Porbeck | 55—459 |
| 2,014,287 | 10/1935 | Newman | 55—429 |
| 2,067,710 | 1/1937 | Jacobsen | 55—459 |
| 522,923 | 7/1894 | Verrell | 55—457 |
| 2,869,677 | 1/1959 | Yellott et al. | 55—459 |
| 3,056,662 | 10/1962 | Ridgway. | |

FOREIGN PATENTS

| | | |
|---|---|---|
| 759,118 | 10/1956 | Great Britain. |
| 900,696 | 7/1962 | Great Britain. |

HARRY B. THORNTON, *Primary Examiner.*

B. NOZICK, *Assistant Examiner.*